Figure 1:
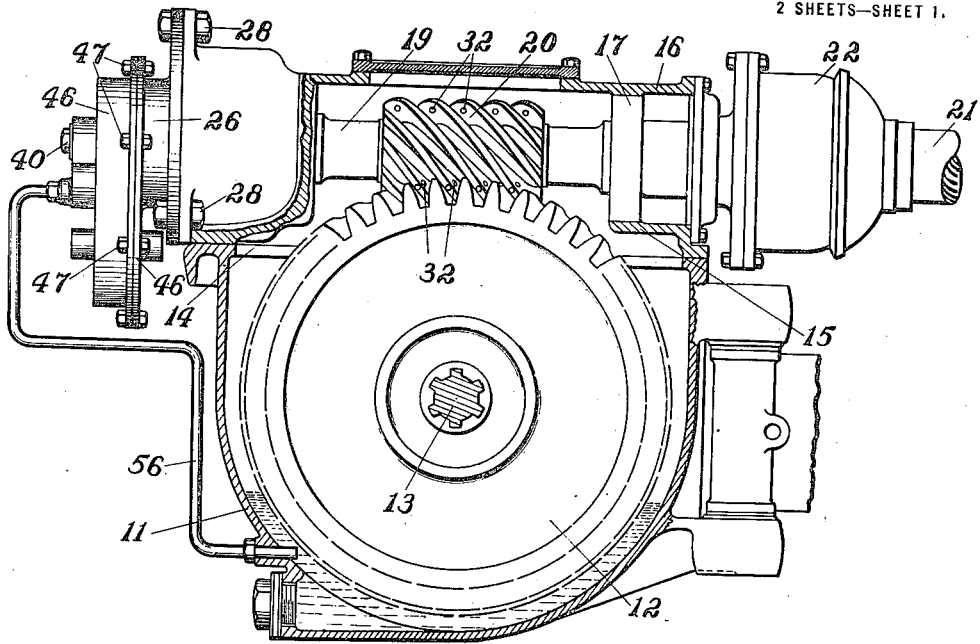

S. D. WALDON.
MOTOR VEHICLE.
APPLICATION FILED MAR. 14, 1913.

1,176,936.

Patented Mar. 28, 1916.
2 SHEETS—SHEET 1.

WITNESSES:
C. J. Cote
LeRoi J. Williams

INVENTOR:
Sidney D. Waldon,
by Milton Tibbetts,
his Attorney

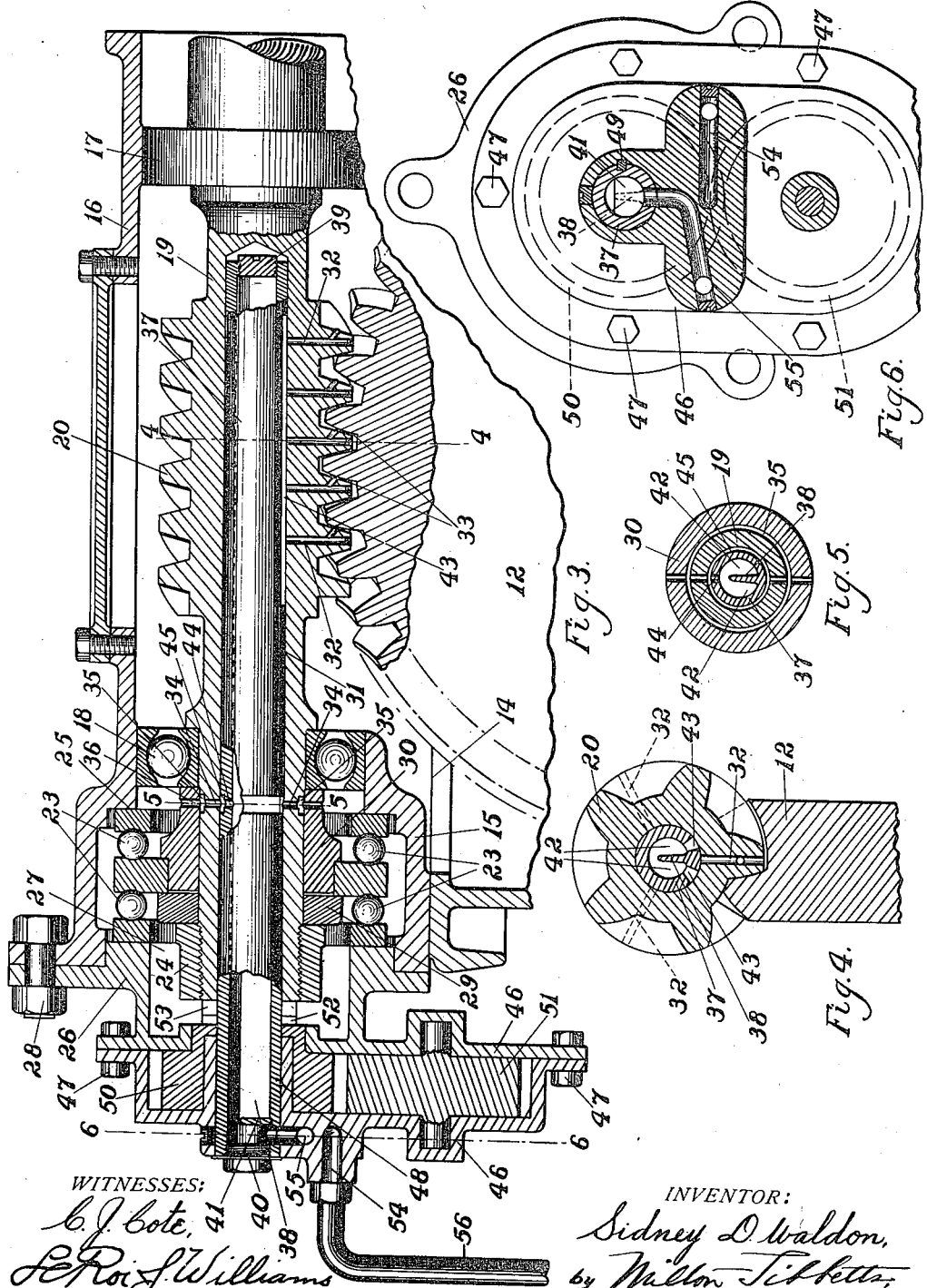

UNITED STATES PATENT OFFICE.

SIDNEY D. WALDON, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,176,936.   Specification of Letters Patent.   Patented Mar. 28, 1916.

Application filed March 14, 1913. Serial No. 754,318.

*To all whom it may concern:*

Be it known that I, SIDNEY D. WALDON, a citizen of the United States, and resident of Detroit, Wayne county, State of Michigan, have invented certain new and useful Improvements in Motor-Vehicles, of which the following is a specification.

This invention relates to motor vehicles, and particularly to the driving gears thereof.

The invention may be said also to relate broadly to gears and means for lubricating them.

More specifically, the invention relates to means for feeding oil either by gravity or under pressure to the contact surfaces of intermeshing gears.

The invention is shown as applied to a worm gear and its intermeshing worm wheel as these gears are used in motor vehicle construction, but it will be understood that the invention is not limited to this particular type of gearing nor to the use of such gearing in motor vehicles.

In motor vehicle construction it is sometimes found necessary or desirable to place the worm of a worm and gear driving mechanism above the gear. With the worm in this position, it is not so easily supplied with lubricant as when it is mounted at the bottom of the casing, and it has therefore become present practice to use a very heavy oil with these gears so that the worm wheel will readily carry the oil to the gear above it.

One of the objects of the present invention is to positively feed oil from the bottom of the casing to the upper or worm gear, so that a lighter oil may be used for this purpose.

Another object of the invention is to feed oil under pressure to the contacting surfaces of a pair of intermeshing gears. In the present case this object is accomplished by feeding the oil through one of the gears.

Another object of the invention is to provide means for feeding oil to a pair of intermeshing gears immediately after the gears have started to rotate, thus getting the oil to the contacting surfaces of the gears sooner than would be done if reliance was placed entirely upon the lower gear carrying oil to the engaging surfaces. As one means for accomplishing this object, the present application illustrates a plurality of oil reservoirs from which oil is fed alternately, but not simultaneously, either by gravity or by pressure, to the contact surfaces of the gears. Thus at least one of these reservoirs always remains full when the gears are stopped, and is ready to deliver its oil to the contact surfaces immediately after the gears have started to rotate again.

Another object of the invention is to supply oil, either by gravity or under pressure, to the bearings of one of the shafts upon which the gears are mounted.

Another object of the invention is to provide an oil circulating pump on the driving shaft of a motor vehicle and so connect it with the driving gears as to supply oil from the gear casing to the gear surfaces and bearings above the normal oil level.

Figure 2:
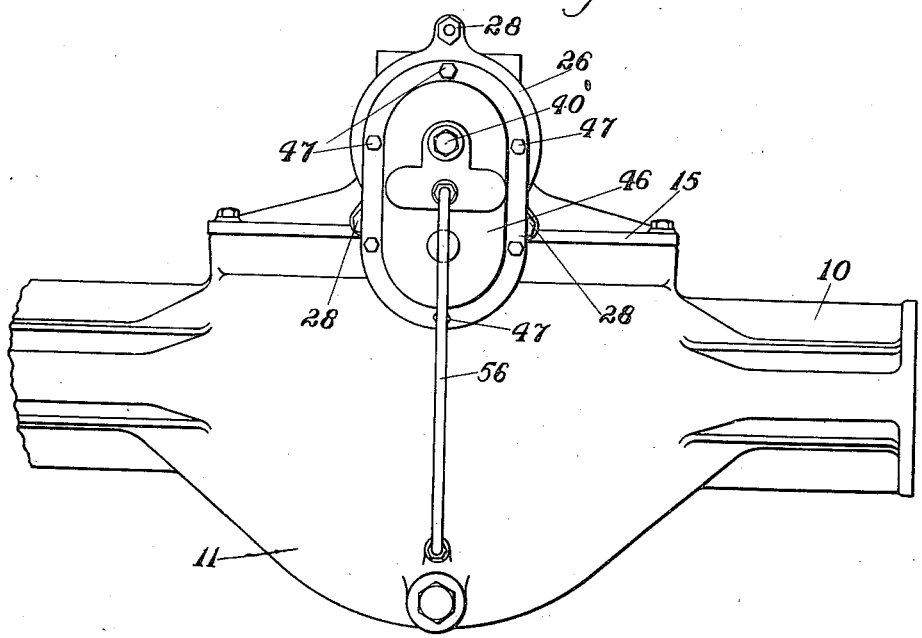

Other objects of the invention will appear from the following description, taken in connection with the drawings which form a part of the specification, and in which, Figure 1 is a vertical sectional view through the central or gear casing portion of a motor vehicle rear axle embodying this invention; Fig. 2 is a rear view of the axle shown in Fig. 1; Fig. 3 is an enlarged vertical sectional view through the motor vehicle driving shaft shown in Fig. 1, together with adjacent portions of the axle casing and the driving gears; Fig. 4 is a transverse section on the line 4—4 of Fig. 3; Fig. 5 is a similar section on the line 5—5 of Fig. 3; and Fig. 6 is a similar section on the line 6—6 of Fig. 3.

Referring to the drawings, 10 represents a motor vehicle driving axle, and 11 is the enlarged central portion thereof which forms a gear casing. It will be understood that this axle 10 is a non-rotating axle and that the driving axle sections are mounted therein and connected by differential gearing which is driven by a gear 12, which, in the present instance, is shown as in the form of a worm gear wheel. One of the sections of the driving axle is shown at 13 in Fig. 1.

The casing 11 forms an oil well for the gear wheel 12, and an opening 14 is formed in the upper part of the casing, through which the gear wheel 12 projects. This opening is provided with a cover 15, which is formed with an enlarged central part 16 in which are the bearings 17 and 18 for the driving shaft 19. The driving shaft 19 has a worm 20 formed as an integral part thereof, or as secured thereto, which worm is adapted to mesh with and drive the worm wheel 12.

It will be understood that the driving shaft 19 is connected with the propeller shaft 21 of the vehicle through a suitable universal joint 22, and is adapted to be driven thereby. It will be further understood that the pitch of the gears is such that the worm wheel may drive the worm, as when the vehicle is coasting.

Besides the radial bearing 18, the shaft 19 is provided with a double thrust bearing 23, the shaft parts of these bearings being secured on this shaft by means of a nut 24 threaded on the end of the shaft. The thrust bearing is also arranged between a shoulder 25 on the cover 15 and a cap 26 which is secured over an opening 27 in the rear end of the enlargement 16. This cap is secured to the cover by a series of bolts 28, as shown in Figs. 1, 2 and 3. Collars 29 and 30 also form part of the securing means for the thrust bearing 23 on the shaft 19.

From the construction so far described, it will be seen that some of the oil in the lower part of the casing 11 will be carried by the teeth of the worm wheel up to the worm by which it is driven, and thereby lubricate to some extent the contacting surfaces of the gears. However, it has been found that when large gears are used and very heavy tooth pressures employed, due to transmission of considerable horse-power through the gears, the oil is squeezed out from between the gear teeth, and cutting sometimes takes place. To obviate this difficulty, a heavier oil is used, which of course will be less liable to be pressed out from between the teeth, but lubrication is not so positive with this oil in cold weather. The present invention is intended to make more certain the lubrication of the contact surfaces of these gears, and to provide for the use of a thin oil and supply it directly to all of the teeth in mesh in sufficient quantities for all requirements. One embodiment of means for so feeding the oil directly to the teeth of the intermeshing gears is shown in this application and will be presently described, but it will be understood that other embodiments may be used without departing from the spirit of the invention or the scope of the claims.

The shaft 19 is longitudinally bored, as shown at 31 in Fig. 3, and several series of channels 32 are formed in the worm and the shaft and extend from the interior of the shaft 19 to the contact surfaces 33 of the teeth of the worm. These series of channels 32 are preferably arranged longitudinally of the shaft 19, as shown in Figs. 3 and 4, for the purpose of delivering oil at intervals during the rotation of the shaft.

The shaft 19 is also provided with transverse channels 34 and an annular channel 35 connecting therewith, and the collar 30 has a registering passage or series of passages 36 radially disposed, whereby there is constant communication between the interior of the shaft 19 and the space in which the bearings 18 and 23 are arranged.

A stationary member 37, in the form of a tube, extends into the bore 31 of the shaft 19 and is arranged to form a reservoir for lubricating oil to be fed to the channels 32 and 34. This tube is preferably divided into two compartments, as by a longitudinal rib 38 which extends from the bottom of the tube nearly to the top thereof. The forward or inner end of the tube is closed by a plug 39, and the rearward end by a plug 40. A cross rib 41 closes the rear end of the compartments or reservoirs 42, thus making the reservoirs independent, except for communication with each other over the top of the rib 38.

The tube is provided with outlet ports or slots 43, which are arranged at the bottoms of the respective compartments 42 and extend along the tube in the zone of the worm 20. These ports communicate with the channels 32 as the shaft 19 is rotated about the tube 37, and it will be seen that the series of channels 32 and the ports 43 are so relatively arranged and proportioned that the compartments 42 will deliver oil alternately to the surfaces of the worm 20, one of the ports 43 going out of register with the channels 32 before the other port 43 goes into register with any of such channels. Therefore, presuming that the compartments 42 are full of oil when the gears stop rotating, only one of the compartments 42 can be drained of oil, as only one of them can possibly be in register with any of the channels 32. Therefore, also, as soon as the gears start to rotate again, the other or full compartment will immediately be placed in communication with one of the series of channels 32, and the oil in said compartment will flow by gravity or by pressure directly to the surfaces of the worm. Thus oil is immediately delivered to the contact surfaces of the gears long before the oil in the bottom of the casing could be brought to the contact surfaces by the gear wheel 12. Of course, it will be obvious that the gears may stop in the position shown in Fig. 4, so that neither of the compartments 42 will be drained, as in that case none of the channels 32 is in register with the ports 43. However, as soon as the worm starts to rotate, one of the series of channels 32 will be almost immediately in register with one of the ports 43, and the oil will be at once delivered to the contact surfaces.

The tube is also formed with a port 44 and an annular groove 45, which latter registers constantly with the channel 34 which delivers oil through the annular channel 35 and passage 36 to the rear bearings of the shaft 19. As the port 44 is in the upper wall of the tube 37, it will be obvious that oil will not be delivered to the bearings until the tube is full. This will prevent draining the compartment 42 into the bearing housing. Obviously, the oil delivered to the bearings 18 and 23 will overflow from the housing back into the casing 11.

The means for supplying lubricant to the tube 37 may comprise any suitable device for the purpose, and in the present embodiment of the invention, this means comprises a gear pump mounted on the cap 26 and driven directly by the shaft 19. A pump housing 46 is formed in two parts, secured together, as by bolts 47, one of the parts being shown as integral with the cap 26. The tube 37 extends beyond the end of the shaft 19 and into the pump housing 46, where it is secured and keyed to a boss 48 on one of the parts of said housing. The key 49 for securing the tube against turning in the boss 48 is shown particularly in Fig. 6.

A pair of pump gears 50 and 51 are properly mounted to rotate in the housing 46, with the gear 50 in axial alinement with the shaft 19. Said latter gear is provided with clutching jaws 52 which coöperate with similar jaws 53 on the end of the shaft 19, so that the gear 50 is directly driven by said shaft.

It will be seen that with the above described construction, the pump gears and the tube 37 may be readily removed by disconnecting the rear part of the pump from the cap 26, without in any way disturbing the bearings of the shaft 19. Also, the entire pump may be removed by disconnecting the cap 26 from the cover 15.

The pump housing 46 is formed with inlet and outlet channels 54 and 55 respectively, the latter communicating with the interior of the rear end of the tube 37, as shown in Figs. 3 and 6. The inlet 54 is connected by a pipe 56 with the lower part of the casing 11, whereby the pump will draw oil from the bottom of said casing and deliver it under pressure to the tube 37 from which it is delivered to the contact surfaces of the gears and to the bearings of the shaft 19, as above set forth.

It is believed that the full operation of the invention is clear from the above detailed description.

Having thus described my invention, what I claim and desire to secure by Letters Patent, is:

1. The combination with a pair of intermeshing gears, of an oil supply below the gears, and means for circulating said oil through one of the gears to the driving surfaces thereof and from said surfaces to said supply.

2. The combination with a casing, a worm wheel mounted therein, and a worm in mesh with and adapted to drive said wheel and mounted substantially horizontally above said wheel, of means operative upon a fractional rotation of said worm for feeding oil to the contacting surfaces of said worm and wheel.

3. The combination with a casing, a worm wheel mounted therein, and a worm in mesh with and adapted to drive said wheel and mounted substantially horizontally above said wheel, of a plurality of oil containing reservoirs, and means for feeding oil alternately from said reservoirs to said worm.

4. The combination with a casing, a worm wheel mounted therein, and a worm in mesh with and adapted to drive said wheel and mounted substantially horizontally above said wheel, of a plurality of oil containing reservoirs, and means controlled by the rotation of said worm for feeding oil alternately from said reservoirs to said worm, whereby not more than one of said reservoirs is drained when the worm and wheel are stopped.

5. The combination with an oil containing gear case, a worm wheel in said case running in the oil, and a worm above said worm wheel, of means for distributing oil under pressure at a point of contact between the worm and the worm wheel.

6. The combination with a gear case containing oil, a worm wheel, a worm, and bearings therefor, of means for delivering oil under pressure to said bearings and to points of contact between said worm and worm wheel.

7. The combination with a case containing oil, a worm member running in the oil, and a worm member above said oil, said worm members making a driving contact, of means operated by one of said members for delivering oil under pressure to the contacting surfaces of said members.

8. The combination with a case containing oil, a worm member running in oil, a worm member above said oil, said worm members making a driving contact, of a pump driven by one of said members, and means for distributing oil under pressure from said pump to the driving surfaces of said members.

9. The combination with a gear case, a worm wheel, a worm, and bearings therefor, of means mounted within said case for positively delivering oil to said bearings and to the driving surfaces of said worm and worm wheel.

10. The combination with a gear casing, a worm having a hollow portion, and a distributer therein having a plurality of compartments and longitudinal openings there-from, said worm having perforations adapted to register with said openings, of means for delivering oil under pressure to said distributer.

11. The combination with a gear casing, a driving worm having a hollow portion and a plurality of perforations leading from said hollow portion to the surface thereof, bearings in said casing, a distributer in said hollow portion having openings adapted to register with said perforations, and means for positively delivering a supply of oil to said distributer.

12. The combination with a gear casing, of a worm having a hollow portion and having perforations leading from the hollow portion to the surface of the worm, supporting bearings for said worm, a hollow distributer in said worm having a plurality of compartments therein, and having openings from said compartments adapted to register with said perforations upon the rotation of said worm, a worm wheel driven by said worm, and means driven by said worm for delivering oil under pressure to said distributer.

13. The combination with a gear casing, of a worm having a hollow portion and having perforations leading to the contact surfaces of the worm teeth, bearings for said worm, a hollow distributer inclosed by said worm, having a plurality of compartments therein, and having openings adapted to register with said perforations and with said bearings, and means for positively delivering oil to said distributer.

14. The combination with a casing, of a hollow driving shaft in said casing extending through an opening therein, a removable cap over said opening, a pump mounted on said cap, a driving connection between said shaft and pump, and means for conveying oil from said pump to the interior of said shaft.

15. The combination with a casing, of a hollow driving shaft in said casing extending through an opening therein, a removable cap over said opening, a pump mounted on said cap, a driving connection between said shaft and pump, a distributing tube extending from said pump into said shaft, and means for supplying oil to said pump.

16. The combination with a casing, of a hollow driving shaft in said casing extending through an opening therein, a removable cap over said opening, a distributing tube mounted in said cap and extending into said shaft, said tube being removable with said cap, and means for supplying oil to said tube.

17. In a motor vehicle, the combination with the rear axle casing, and driving gears therein, of an oil pump mounted in the axle casing and driven by one of the shafts of said gears and means for carrying the oil under pressure from the pump to the gears.

18. In a motor vehicle, the combination with the rear axle casing having driving and driven shafts therein and worm gears connecting said shafts, of a gear pump having one of its gears in alinement with the driving shaft and driven thereby, and means for conveying oil from said pump to the gears.

19. In a motor vehicle, the combination with the axle casing, the axle sections therein, the worm wheel connected to said axle sections, and the driving shaft mounted in bearings in the casing above the worm wheel and having a worm in mesh with said wheel, of an oil pump mounted on said casing at the end of said driving shaft and adapted to supply oil to said gears and bearings.

20. In a motor vehicle, the combination with the axle casing having an enlarged central portion with a top opening, and a cover for said opening having an enlarged portion with a rear opening, of a driving shaft mounted in the enlarged part of said cover, a cap to close said rear opening, an oil pump secured to said cap, and means for driving said oil pump from said driving shaft.

In testimony whereof I affix my signature in the presence of two witnesses.

SIDNEY D. WALDON.

Witnesses:
Le Roi J. Williams,
H. B. Knap.